United States Patent
Brumana et al.

(10) Patent No.: US 8,408,093 B2
(45) Date of Patent: Apr. 2, 2013

(54) PROTECTION DEVICE WITH AERODYNAMIC EFFECT FOR A MOTOR VEHICLE

(75) Inventors: Matteo Brumana, Ferno (IT); Marcello Caligiuri, Ferno (IT); Fiorenzo Fanali, Ferno (IT); Fabio Rigolio, Ferno (IT)

(73) Assignee: Rizoma S.r.l. (IT)

( * ) Notice: Subject to any disclaimer, the term of this patent is extended or adjusted under 35 U.S.C. 154(b) by 189 days.

(21) Appl. No.: 12/688,546

(22) Filed: Jan. 15, 2010

(65) Prior Publication Data
US 2010/0180716 A1   Jul. 22, 2010

(30) Foreign Application Priority Data

Jan. 16, 2009   (IT) .............................. MI2009A0034

(51) Int. Cl.
*B62K 21/12* (2006.01)

(52) U.S. Cl. ...................................... 74/551.8

(58) Field of Classification Search ................. 74/551.8; 296/78.1; 248/230.1; 224/419, 420, 447
See application file for complete search history.

(56) References Cited

U.S. PATENT DOCUMENTS

| | | | |
|---|---|---|---|
| 3,832,912 A * | 9/1974 | Edwards ....................... 74/551.8 |
| 3,834,249 A | 9/1974 | Bothwell | |
| 4,141,567 A | 2/1979 | Scott | |
| 5,299,466 A * | 4/1994 | Heilbron et al. ............. 74/502.2 |
| D366,015 S * | 1/1996 | McCormack ................. D12/114 |
| 5,848,555 A * | 12/1998 | Watarai ...................... 74/473.13 |
| 6,003,405 A * | 12/1999 | Giard ........................... 74/551.3 |
| 6,389,929 B1 * | 5/2002 | Calilung et al. ............. 74/551.9 |
| 6,421,879 B1 * | 7/2002 | Gratz et al. ....................... 16/422 |
| 7,257,873 B2 * | 8/2007 | Laivins et al. .................... 29/412 |
| 2007/0039408 A1 * | 2/2007 | Laivins et al. ............... 74/551.8 |
| 2008/0203762 A1 | 8/2008 | Shimanski | |
| 2008/0264198 A1 * | 10/2008 | Laivins et al. ............... 74/551.8 |

FOREIGN PATENT DOCUMENTS

JP       2001239975 A  *  9/2001

* cited by examiner

*Primary Examiner* — Vicky Johnson
(74) *Attorney, Agent, or Firm* — Akerman Senterfitt (57) ABSTRACT

A protection device is described for the ends of a handlebar (M) of a motorcycle, of the type comprising a protection member which can be attached to the ends of said handlebar (M), which comprises a structural protection member (1) which can be attached with an attachment portion (2°) to the ends of said handlebar (M), and having an aerodynamic guard (3) intended to be positioned in front of an actuation lever (L) of said handlebar (M) of the motorcycle, the aerodynamic guard being configured to reduce the dynamic pressure downstream thereof.

11 Claims, 7 Drawing Sheets

PROTECTION DEVICE WITH AERODYNAMIC EFFECT FOR A MOTOR VEHICLE

FIELD OF APPLICATION

The present invention relates to a protection device for motorcycles, more particularly a protection device to be attached to the handlebar of a motorcycle.

STATE OF THE ART

As is known, the front part of a motorcycle generically has a steering unit (equipped with a wheel or, as in quad bikes, two wheels) mounted rotatingly on a steering column and controlled by an upper handlebar with two lateral extensions.

The handlebar, in conditions of normal travel, is positioned orthogonally to the direction of forward movement, with the two lateral extensions which normally terminate flush with or outside of the lateral profile of the motorbike. At the end of the lateral extensions of the handlebar grips are provided for the hands and other controls essential to the working of the motorbike, such as a grip/gas lever, a clutch lever and a brake lever.

Since the ends of the handlebar constitute one of the most exposed parts of the motorcycle, both in the front and side direction, there is the need to define means of protection not only in respect of accidental falls, but also in respect of impact with other elements during normal travel.

In fact, in the event of a fall, the ends of the handlebar typically hit the ground. Without means of protection not only is there the risk of scratching or denting the end of the handlebar, but there is also the risk of breaking or bending the brake/clutch levers.

A partial solution to this problem is provided by removable caps (in metal or an elastic material) which can be screwed to the ends of the handlebar. In the event of a fall, they can be removed and replaced.

This solution, in some cases, does not however ensure adequate protection of the brake/clutch levers.

Furthermore, during movement of the motorcycle, it is possible for branches or other vegetation parts, in the case of off-road travel, to hit the ends of the handlebar, perilously tangling in the brake/clutch levers or injuring the hands of the rider. The same dynamic pressure of the air on the brake/clutch levers, in the case of road travel at high speed, can cause undesirable effects on the hydraulic circuit: for example a light pressure on the brake lever may cause a minimal displacement of the brake pads which, in time, causes irregular wear of the braking system.

In the area of competitions, more particularly, it has been found that over a speed of 180 km/h the front brake lever and clutch lever are affected by a dynamic pressure of the air which causes a pressure up to 0.7-0.8 bar in the relative hydraulic system. This causes friction between front brake pads and disk and friction with the components of the hydraulic clutch control system.

A possible solution for these extreme cases has been found by providing milled openings in the external end portion of the levers. These openings maintain the functions of the lever unaltered yet allow a partial reduction in the aerodynamic pressure.

Another solution consists of complex fairings, mounted on the handlebar and extending in front of the brake/clutch levers.

These fairings however are bulky and unsightly and above all are subject in turn to breaking in the event of a fall.

Moreover these fairings cannot be used in the area of speed competitions, typically MotoGP, as they would be outside of the maximum profile laid down by the regulations. In the area of competitions, however, it would be equally desirable to be able to have effective protection also against impact, since it is not unusual for a brake lever of a motor vehicle to come into contact with a motor vehicle immediately ahead, with consequences that can be imagined.

Object of the present invention is therefore that of providing an improved protection device, which is effective in respect both of accidental contacts with obstacles or with the ground and in the case of interference with other elements during travel (including therein pressurised air).

At the same time the aim is to provide a device which is streamlined and economical, has a particularly pleasing aesthetic impact and is effective from the aerodynamic standpoint.

SUMMARY OF THE INVENTION

These objects are achieved through the features mentioned in the annexed independent claims. The dependent claims describe preferred features of the present invention.

More particularly, according to the invention a protection device is provided for the ends of a handlebar of a motorcycle, of the type comprising a protection member which can be attached to the ends of said handlebar, which comprises at least one attachment portion integral with a structural protection portion at whose end an aerodynamic guard is provided, intended to be placed in front of an actuation lever of said handlebar of the motor vehicle, the aerodynamic guard being configured to reduce the dynamic pressure downstream thereof.

According to a preferred application of the invention, the aerodynamic guard is in the form of a substantially triangular prismatic body with increasing section, wherein a corner is provided which acts as a leading edge for separating a dynamic flow into an upper and a lower portion.

Further features and advantages of the invention will in any case be made clearer by the following detailed description, given by way of an example and illustrated in the accompanying drawings, in which:

DETAILED DESCRIPTION

As shown clearly in FIGS. 1-6, the device according to the invention comprises a protection member which comprises a structural member 1, substantially L-shaped, i.e. composed of two legs 2 and 3 joined one to the other orthogonally. The device 1 is designed in such a way that the end 2a of an attachment leg 2 can be connected to the external apex of a grip of a motorcycle handlebar (M), while the other orthogonal leg 3 has an aerodynamic configuration which is illustrated herein below.

More particularly the attachment leg 2, in the embodiment illustrated, has a rectilinear section whose end 2a is enlarged to form an attachment bulb. The latter is traversed by a through hole, transversal to the longitudinal axis of the leg 2, wherein an Allen screw 2b is inserted, intended to be screwed in a longitudinal hole (not shown) provided at the two ends of a motorcycle handlebar.

Preferably, in order to define a better join also with the grip with which the end section of the handlebar is normally provided, between the end 2a and the end of the handlebar a spacer 2c is placed, in the form of a bell appropriately shaped and joined. The spacer has the task, in the specific embodiment illustrated, of displacing towards the exterior of the handlebar the attachment point of the aerodynamic leg 3.

According to a preferred embodiment the attachment leg 2 can be adjusted in length so as to be able to adapt the position of the aerodynamic leg 3 in relation to the handlebar.

For this purpose the attachment leg 2 is made up of two portions which can be inserted one in the other. More particularly the head portion 2a has a sleeve extension 2a', provided with a longitudinal hole wherein it can be inserted, more or less deeply, while the remaining portion of the leg 2 is in the form of a stem 2' with which the aerodynamic leg 3 is integral. In the sleeve portion 2a', more particularly on the lower side (see FIGS. 3B and 4), one or two threaded holes G are also provided wherein a corresponding number of threaded dowels, for example of the M4×4 type, are positioned.

The relative position of insertion between the stem 2' and the sleeve 2a', once identified, can be maintained by blocking the threaded dowels inserted in the holes G. Doing this enables the user to perform the regulation shown in FIG. 3A.

Figure 1:
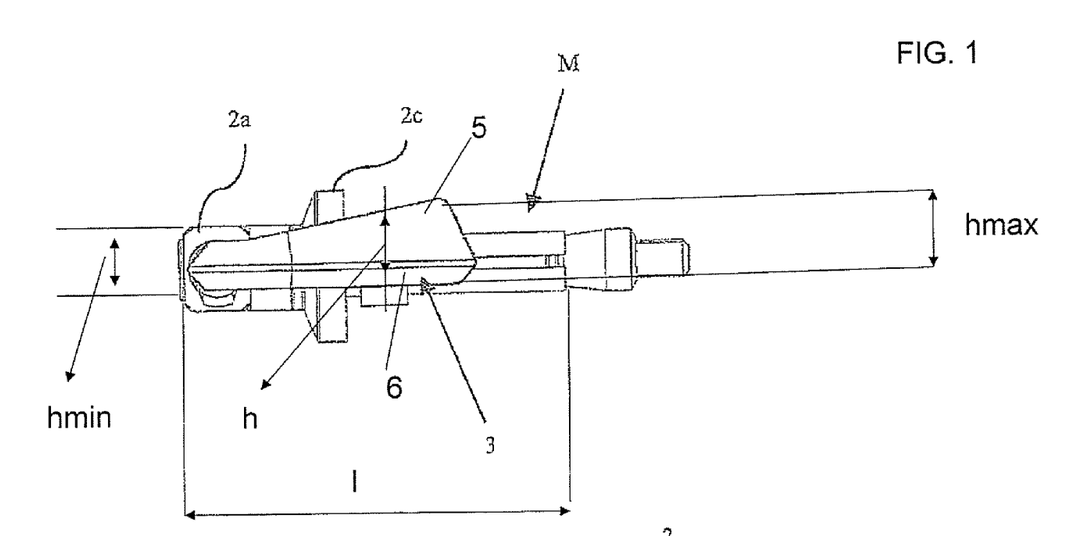
FIG. 1 is a front elevation view of the device according to the invention.
Figure 2A:
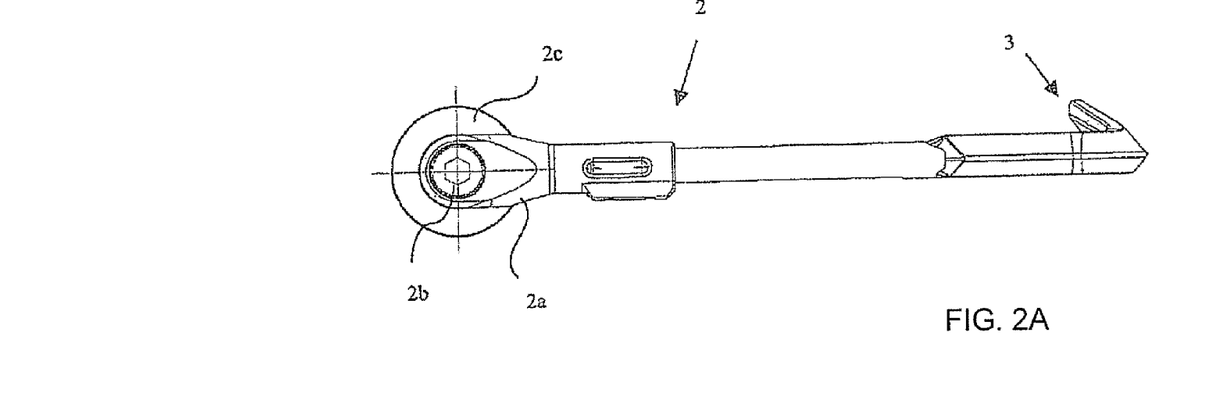
FIG. 2A is a side elevation view of the device according to the invention.
Figure 2B:
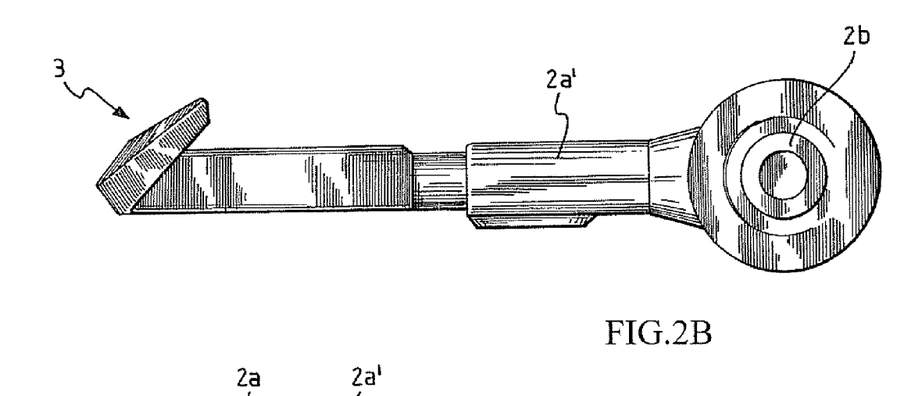
FIG. 2B is a photographic image similar to that of FIG. 2A but seen from the opposite side.
Figure 3A:
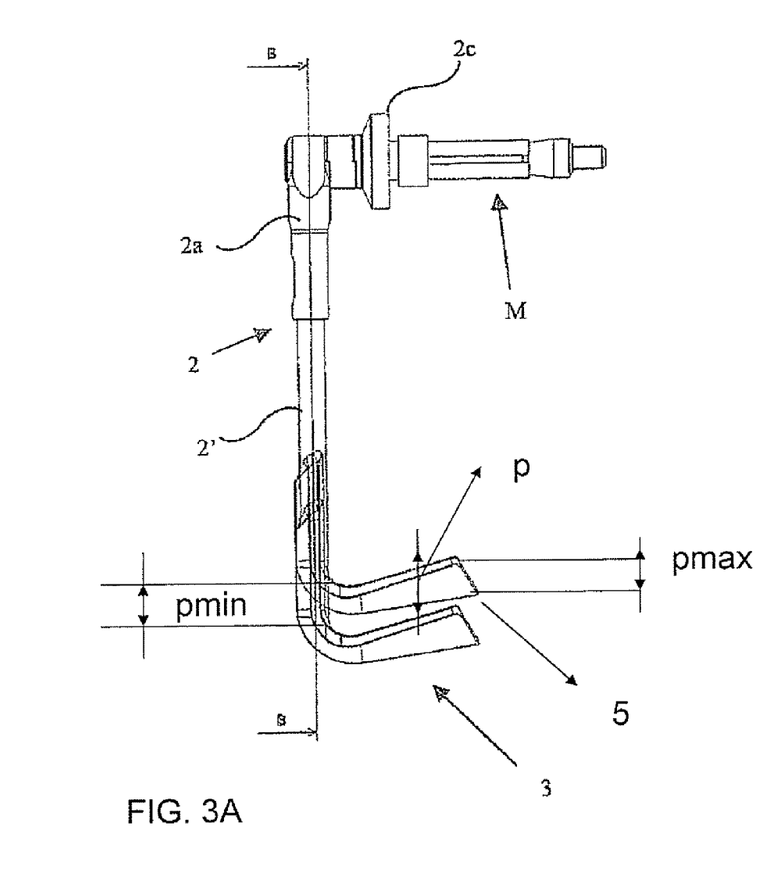
FIG. 3A is a plan view from above of the device according to the invention.
Figure 3B:
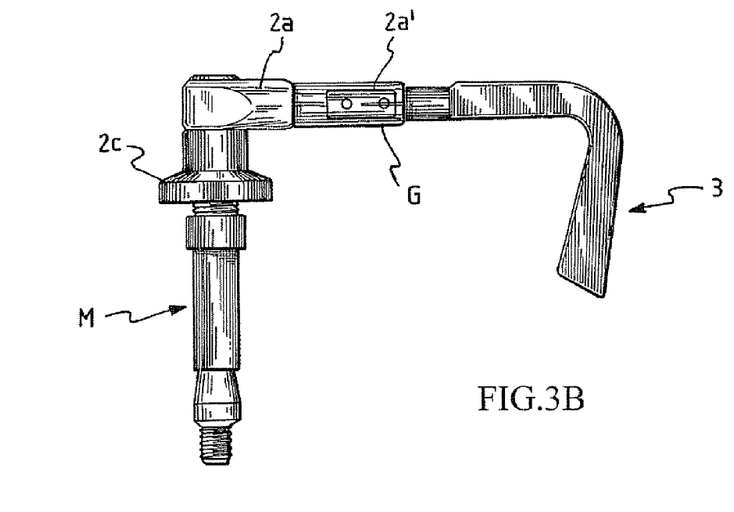
FIG. 3B is a plan photographic image from below of the device according to the invention.
Figure 4:
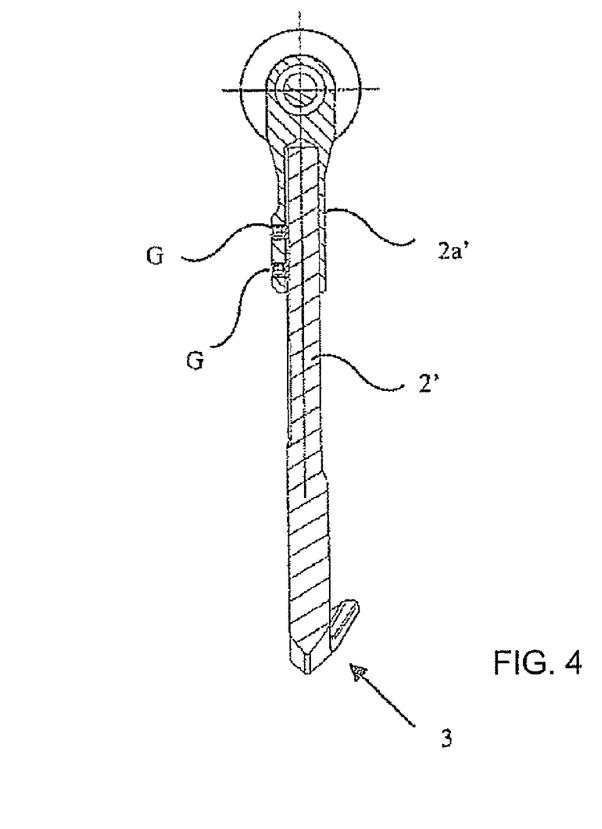
FIG. 4 is a sectioned view taken along line B-B of FIG. 3.
Figures 5, 6:
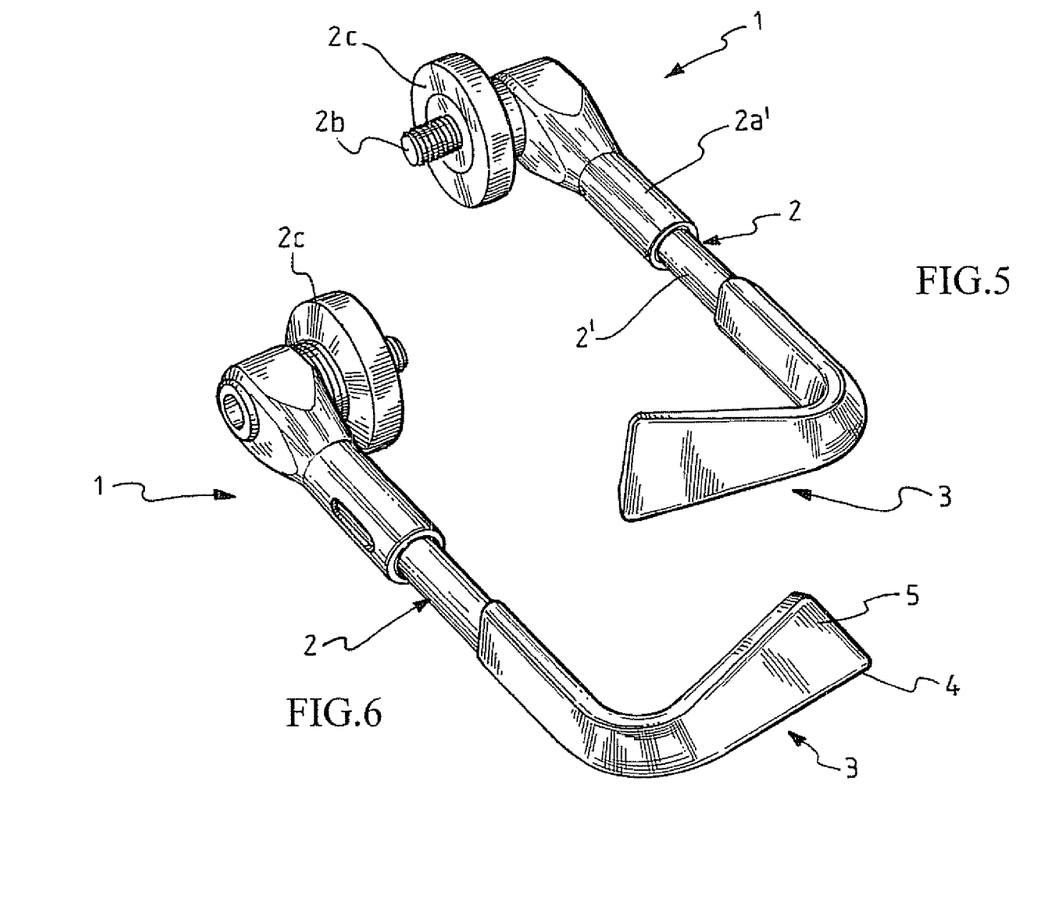
FIGS. 5 and 6 are two different photographic images of a device according to the invention, designed for attachment to a right or left grip respectively of a motorcycle handlebar.
Figure 7:
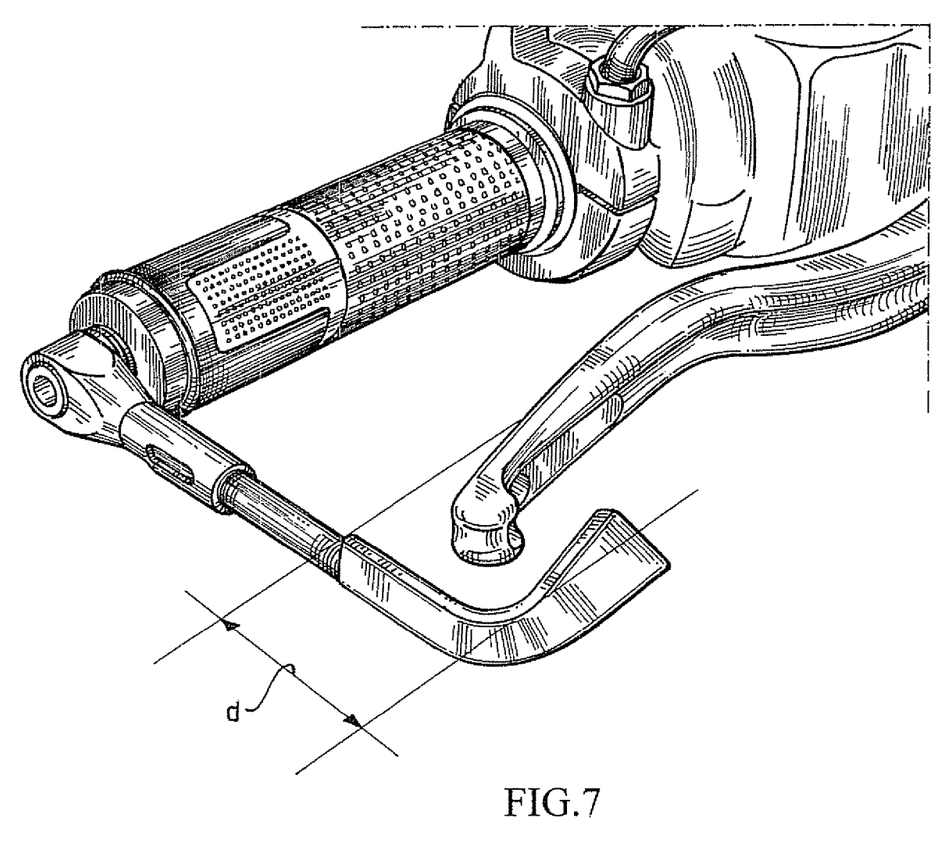
FIG. 7 is a photographic image of a device according to the invention attached to a grip of a motorcycle handlebar.

The aerodynamic leg 3 consists substantially of an aerodynamic guard body, as can be seen clearly in FIGS. 1, 2A and 2B, which extends from the attachment leg 2, i.e. from the exterior of the handlebar, for a short section inwards, so as to be positioned in part in front, not only of the grip of the handlebar (M) but also of the respective actuation lever L (clutch or brake).

More particularly, the guard of the leg 3 is in the form of a substantially triangular prismatic body. According to the preferred embodiment illustrated, the guard has a depth p (in the direction of the motorbike) and a height h which increase in the direction of the longitudinal axis of the motor vehicle. A front corner 4 of the guard acts as aerodynamic leading edge in respect of the flow which hits the moving motor vehicle. After having hit this leading edge, the fluid streams of the flow of air divide into the part below and into the part above.

As can be seen from the drawings, the triangular section of the guard is preferably not regular, instead a part 5 or band above the front corner (leading edge) is greater compared to a part 6 or band below. Better still the section of the guard increases in height only in the part above the corner, so that the corner remains defined substantially horizontal (i.e. aligned with the rear grip/actuation lever).

The internal part of the prismatic body, i.e. the downwind part, does not play a fundamental role and therefore can be flat or with the load considerably reduced, to lighten the part.

Substantially, the effect which the guard is intended to produce is a vorticity of the flow which drastically reduces the dynamic pressure of the flow of air on the portion of motorcycle immediately downstream thereof, i.e. on the apex of the actuation lever positioned at the ends of the handlebar.

Therefore, for good working of the system, the spacer 2c and the length regulation of the attachment leg 2 should be designed in such a way that the aerodynamic guard of the leg 3 puts at least the end portion of the actuation lever of the motorcycle "in the shade" in aerodynamic terms.

Figure 8:
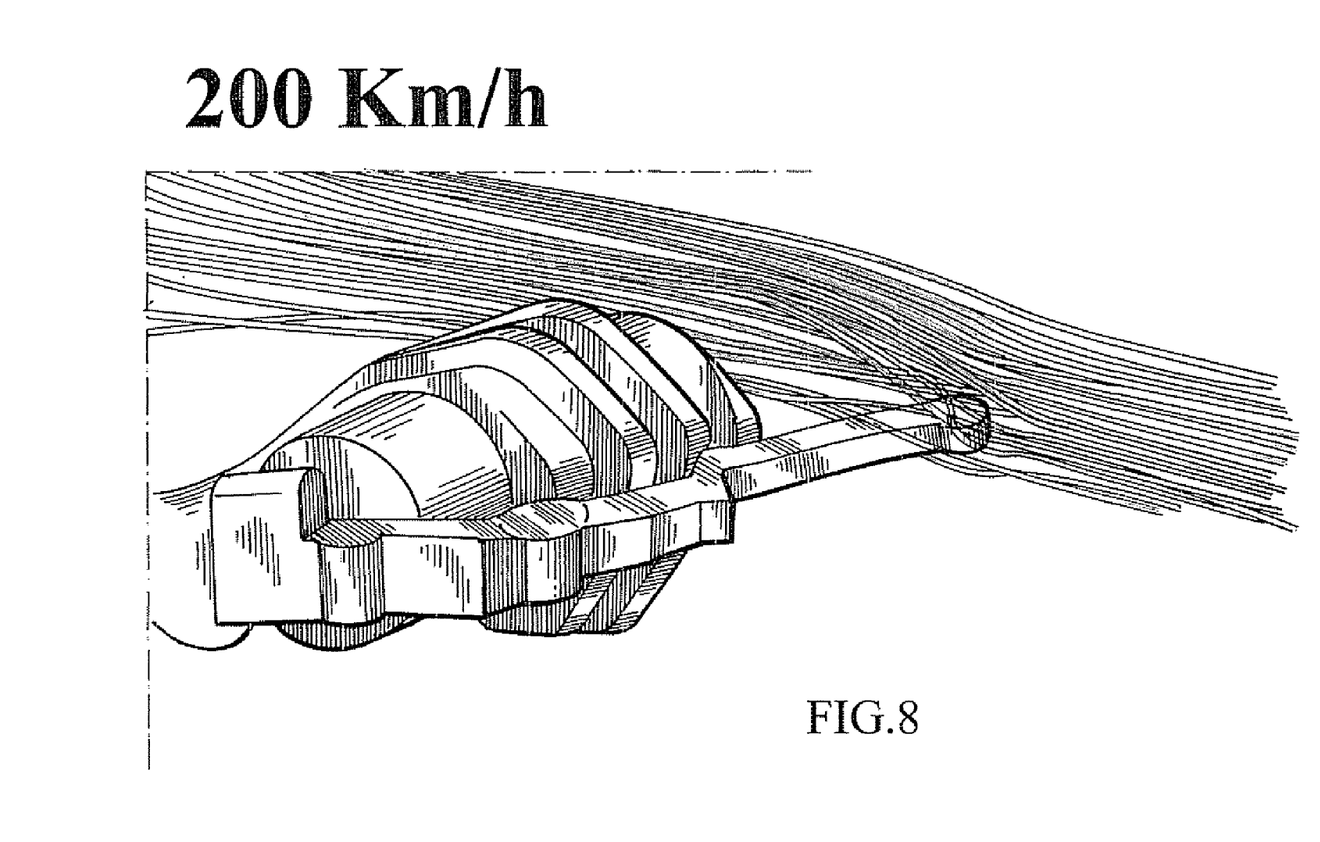
FIG. 8 is a schematic view of simulations of fluid streams at 200 km/h on a portion of handlebar provided with the device according to the invention.
Figure 9:
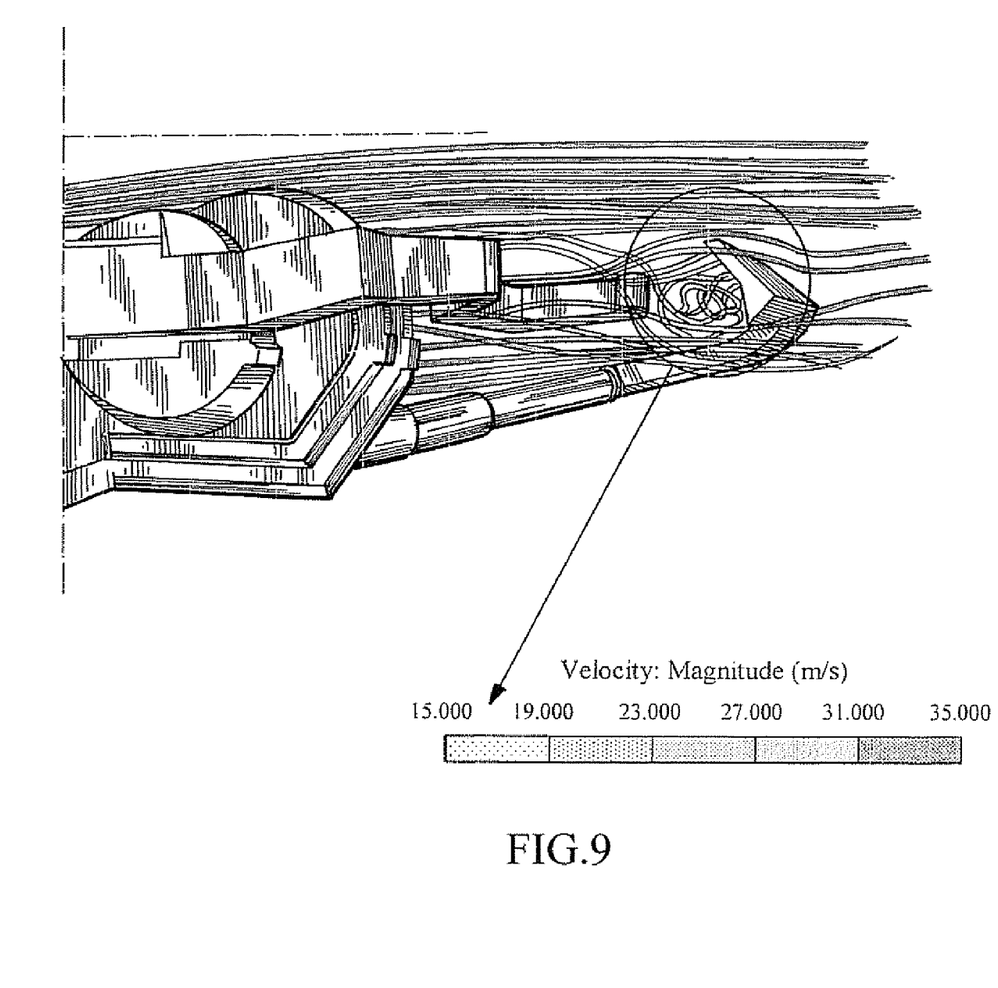
FIG. 9 is a schematic view of numerical simulation of the trend of the flow in proximity of a handlebar provided with the device according to the invention.

FIGS. 8 and 9 illustrate some numerical simulations of the flow around the device of the invention mounted on the handlebar of a motor vehicle, which have confirmed the efficacy of the invention.

FIG. 8 demonstrates the absence of fluid streams which involve the apex of the actuation lever. These streams are instead present when the device is not present.

Moreover, from simulations performed on the Applicant's premises, it was possible to calculate the dynamic pressure (Pa) of the flow of air on the various components and demonstrate that, thanks to the presence of the device of the invention, it can be seen that the pressure on the apex of the lever remains at favourable levels.

FIG. 9 shows the trend of the fluid streams immediately downstream of the aerodynamic guard, wherefrom it can be deduced that the latter produces a point of stagnation downstream whereof turbulence is produced which removes energy from the flow and therefore leads to a reduction in dynamic pressure on the rear (left in the drawing) apex of the actuation lever of the motor vehicle.

According to a preferred embodiment, it was found that the most advantageous results, as a compromise between the resistance caused by the device and the beneficial effect of reduction of dynamic pressure on the lever, are obtained with a guard having a height h increasing from a height hmin of about 1 cm to a height hmax of about 2 cm and a depth or aerodynamic chord (i.e. its dimension in the direction of the flow) p similarly increasing from a minimum value pmin of about 1 cm to a maximum value pmax of 2 cm. Moreover the aerodynamic guard should preferably be positioned in front of the lever for at least 10% of its length, preferably up to 30%: this means, for a standard arrangement of grip and lever on a road motor vehicle, a length l of the aerodynamic leg 3 of about 5-6 cm.

The guard, moreover, must remain at a distance d from the actuation lever no greater than twice the height or depth dimension. This is obtained if necessary by acting on the regulation of the length of the attachment leg 2.

The device of the invention must be manufactured with resistant material, since one of its primary functions is that of forming protection against the contact with obstacles, withstanding as far as possible the kinetic energy also deriving from the speed. On the other hand the aim is to supply an object which is not excessively heavy and which can be manufactured easily with the preferred aesthetic or aerodynamic lines without compromises.

In addition to a metal material, such as aluminium alloy, the Applicant has identified as a particularly preferable material POM-C, possibly reinforced with glass fibre, i.e. a synthetic resin which also has optimal weather behaviour.

As can be seen from the description given above, the device according to the invention achieves perfectly the objects disclosed in the introduction.

In fact the configuration of the device allows, on the one hand, provision of an effective protection member against accidental contacts of the most exposed parts of a motor vehicle, such as the ends of the handlebar. The ruggedness and the curving of the device mean that, in the event of contact, it defines a sacrificial resting point of the motorcycle and absorbs the energy of the impact well without other critical parts of the motorcycle being jeopardised or preventing accidental actuation of the lever brake (which would cause the overturning of the motor vehicle).

The protection offered to the levers also guarantees safety of driving both in speed competitions on tracks and in travelling on traditional routes.

The special shape of the front surfaces makes the device aesthetically pleasing and at the same time aerodynamically effective, i.e. with low resistance yet with optimal capacity for reducing the pressure on the actuation levers.

The substantial reduction of the pressure on the levers, particularly at the end portion, ensures good working of the control system and therefore avoids overheating of the braking system.

It is in any case understood that the invention is not limited to the particular configurations illustrated above, which only constitute non-limiting examples of the scope of the invention, but instead that numerous variants are possible, all within the reach of a person skilled in the art, without thereby departing from the sphere of the same invention.

For example it is not strictly necessary for the attachment leg to be rectilinear and orthogonal to the aerodynamic leg, provided the latter can be positioned in an aerodynamically effective way in front of the ends of the actuation levers of the motorcycle. In a final analysis the device could constitute a single elongated and curved body which starts from the end of the handlebar and ends in front of the actuation lever with an aerodynamic guard.

Furthermore it is not excluded that the same internal apex of the guard (i.e. the end turned towards the main axis of the motorcycle) may comprise other aerodynamic solutions (for example openings or fins) for further reducing the induced aerodynamic resistance thereof).

The invention claimed is:

1. A protection device which can be attached to the end of a handlebar (M) of a motorcycle, comprising:
   an L-shaped structural member comprising two legs orthogonally joined to one another,
   wherein one leg of the L-shaped structural member has an adjustable length and has an attachment portion for attachment to the end of said handlebar (M), and
   wherein the other leg of the L-shaped structural member constitutes an aerodynamic guard intended to be positioned in front of an actuation lever (L) of said handlebar (M), the aerodynamic guard being configured to reduce the dynamic pressure downstream thereof, and
   wherein the length of the adjustable leg is adjustable to obtain a distance (d) between the aerodynamic guard and the actuation lever (L) which equals a maximum height (h max) or a maximum depth or aerodynamic chord (p max) of the aerodynamic guard.

2. The device according to claim 1, wherein said aerodynamic guard is in the form of a substantially triangular prismatic body.

3. The device according to claim 2, wherein the aerodynamic guard has a length between 10% and 30% of a length of the actuation lever (L) of said handlebar (M).

4. The device according to claim 2, wherein the aerodynamic guard has increasing height (h).

5. The device according to claim 4, wherein the height (h) of the aerodynamic guard varies between a minimum value (hmin) of about 1 cm and a maximum value (hmax) of about 2 cm.

6. The device according to claim 1, wherein said aerodynamic guard has a corner of intersection between an upper band or portion and a lower band or portion, said corner acting as a leading edge for separating a dynamic flow into an upper portion and into a lower portion.

7. The device according to claim 6, wherein the aerodynamic guard has a triangular section increasing in height only at the upper band portion.

8. The device according to claim 1, wherein the aerodynamic guard has a section of increasing depth or aerodynamic chord (p).

9. The device according to claim 8, wherein said depth (p) varies between a minimum value (pmin) of about 1 cm and a maximum value (pmax) of about 2 cm.

10. The device according to claim 1, wherein said attachment portion comprises a bell-shaped spacer.

11. The device according to claim 1,
    wherein a length (l) of said aerodynamic guard does not exceed 6 cm.

* * * * *